United States Patent
Will

(10) Patent No.: US 12,130,240 B2
(45) Date of Patent: Oct. 29, 2024

(54) INSPECTION METHOD AND APPARATUS FOR INSPECTING CONTAINERS TO DETERMINE WHETHER INSPECTION APPARATUS IS OPERATIONAL

(71) Applicant: KRONES AKTIENGESELLSCHAFT, Neutraubling (DE)

(72) Inventor: Christof Will, Obertraubling (DE)

(73) Assignee: KRONES AKTIENGESELLSCHAFT, Neutraubling (DE)

( * ) Notice: Subject to any disclaimer, the term of this patent is extended or adjusted under 35 U.S.C. 154(b) by 0 days.

(21) Appl. No.: 17/756,698

(22) PCT Filed: Oct. 13, 2020

(86) PCT No.: PCT/EP2020/078692
§ 371 (c)(1),
(2) Date: May 31, 2022

(87) PCT Pub. No.: WO2021/110305
PCT Pub. Date: Jun. 10, 2021

(65) Prior Publication Data
US 2023/0003665 A1    Jan. 5, 2023

(30) Foreign Application Priority Data
Dec. 2, 2019  (DE) .................... 10 2019 132 654.0

(51) Int. Cl.
*G01N 21/90* (2006.01)
*G01N 21/93* (2006.01)

(52) U.S. Cl.
CPC ............. *G01N 21/90* (2013.01); *G01N 21/93* (2013.01)

(58) Field of Classification Search
CPC ........ G01N 21/90; G01N 21/93; G01N 21/88; B08B 9/46; G01B 11/04; G01M 11/00
See application file for complete search history.

(56) References Cited

U.S. PATENT DOCUMENTS

| | | | |
|---|---|---|---|
| 2003/0012421 A1* | 1/2003 | Werzinger | G01N 21/90 382/142 |
| 2006/0045324 A1* | 3/2006 | Katayama | G01N 21/9054 356/240.1 |
| 2013/0271755 A1* | 10/2013 | Lindner | G01N 21/90 356/240.1 |

FOREIGN PATENT DOCUMENTS

| | | |
|---|---|---|
| DE | 19646678 A1 | 5/1998 |
| DE | 10065321 A1 | 7/2002 |
| DE | 102006022492 B4 | 9/2011 |

(Continued)

OTHER PUBLICATIONS

ISA European Patent Office, International Search Report Issued in Application No. PCT/EP2020/078692, Feb. 8, 2021, WIPO, 4 pages.

*Primary Examiner* — Jennifer D Bennett
(74) *Attorney, Agent, or Firm* — McCoy Russell LLP

(57) ABSTRACT

Inspection method for inspecting containers, such as bottles, where an image of a container moved past an inspection device is recorded by the inspection device and the recorded image is compared with a reference image, where the reference image is formed from a number of previously recorded images of containers moved past the inspection device and it is determined in dependence of the comparison of the recorded image with the reference image whether the inspection device is operational.

12 Claims, 2 Drawing Sheets

(56) References Cited

FOREIGN PATENT DOCUMENTS

| | | | |
|---|---|---|---|
| DE | 102014106992 A1 | | 11/2015 |
| EP | 2927868 A1 | | 10/2015 |
| JP | H0989805 A | * | 4/1997 |
| WO | 02054050 A2 | | 7/2002 |
| WO | 02054050 A3 | | 7/2002 |

* cited by examiner

INSPECTION METHOD AND APPARATUS FOR INSPECTING CONTAINERS TO DETERMINE WHETHER INSPECTION APPARATUS IS OPERATIONAL

CROSS REFERENCE TO RELATED APPLICATIONS

The present application is a U.S. National Phase of International Application No. PCT/EP2020/078692 entitled "INSPECTION METHOD FOR INSPECTING CONTAINERS," and filed on Oct. 13, 2020. International Application No. PCT/EP2020/078692 claims priority to German Patent Application No. 10 2019 132 654.0 filed on Dec. 2, 2019. The entire contents of each of the above-listed applications are hereby incorporated by reference for all purposes.

TECHNICAL FIELD

The present invention relates to an inspection method for inspecting containers such as bottles and an inspection apparatus for inspecting containers such as bottles.

BACKGROUND AND SUMMARY

Inspection methods and inspection apparatuses are sufficiently known from prior art. These inspection apparatuses typically comprise one or more inspection devices, such as cameras, which can record images of containers moved past them. It is known, for example, to record a side view of the container and/or a bottom view of the container and/or a view of the mouth of the container in order to be able to detect any fouling of the container or even damage before the container is supplied to further treatment steps. On the one hand, this can be advantageous in the manufacture of the containers, but on the other hand, it can also provide advantages when recycling containers that have already been used. In the case of newly manufactured containers, it can thus be ensured that undesirable malfunction does not occur in the manufacturing process of the container. When recycling containers, it can be ensured that the containers are still intact and/or are not contaminated with fouling that is difficult or impossible to remove (e.g. corks or the like that have dropped in).

Determining whether such fouling is present is typically done by comparing the recorded image with a reference image. The reference image typically represents the undamaged and/or non-contaminated container or a relevant part of the container (mouth, base, etc.).

While this comparison typically produces good results for the individual container, it is subject to systemic weaknesses. For example, if the camera lens is dirty or fogged up, then the same fouling can be indicated for a series of consecutive containers, or fouling may not be detected at all.

In order to eliminate these problems, test containers are typically passed through the inspection apparatus at regular intervals and the images of these test containers recorded are compared with reference images. For this purpose, the test containers have fouling applied to them, for example, at certain points. If this is not detected or if "fouling" is additionally detected at other points, then this indicates that the inspection device is not operating properly. In addition, there are safety mechanisms that, in the event that the same "fault" (e.g. fouling at the same spot) is discovered for a series of consecutive containers, information is output that the inspection device probably has a fault or even that the inspection apparatus is caused to halt.

While these methods generally provide good results when inspecting the containers, the use of test containers involves considerable effort for detecting any faults in the inspection device. In addition, there is the possibility that a number of containers that have not been properly inspected will either be treated as undamaged or are incorrectly sorted out.

Object

Proceeding from the known prior art, the technical object to be satisfied is therefore to specify an inspection method and an inspection apparatus for inspecting containers with which reliable inspection of the containers and reliable detection of faults in the inspection device are made possible.

Solution

According to the invention, this object is satisfied by an inspection method and an inspection apparatus.

The inspection method according to the invention for inspecting containers, such as bottles, comprises that an image of a container moved past an inspection device be recorded by an inspection device and the recorded image be compared with a reference image, where the reference image is formed from a number of previously recorded images of containers moved past the inspection device, and it is determined in dependence of the comparison of the recorded image with the reference image whether the inspection device is operational.

The reference image is therefore determined from the images previously recorded. If a newly recorded image deviates from the reference image (e.g. due to the inspection device being fogged up unintentionally), this can thus be detected. At the same time, the use of test containers is superfluous or can be carried out at significantly longer time intervals than before so that the throughput can be increased.

Furthermore, the method can comprise determining from the reference image and from the recorded image a parameter that is characteristic of the operationality of the inspection device, and where it is determined in dependence of a difference between the parameter determined from the reference image and the parameter determined from the recorded image whether the inspection device is operational.

Characteristic parameters for the operationality of the inspection device are typically independent of the container and relate, for example, to parameters that indicate that the inspection device (when configured in the form of a camera) is fogging up or that there is dirt in or on the lens. These parameters can also be detected or derived from images recorded for different containers. This embodiment ensures that the analysis of the operationality of the inspection device is based on a container-independent parameter, and the operationality of the inspection device is therefore analyzed independently of any fouling of the containers.

The characteristic parameters can there either be parameters that arise from an image pixel by pixel. When fouling of the optics of the inspection device is detected, for example, a number of pixels that represent the fouling can be identified. Alternatively, however, characteristic parameters can also represent parameters or information arising from a (statistical) evaluation of an image and are then independent of information associated with a specific pixel. For example, the entropy of the image, the contrast or the definition of the image are variables that are independent of specific pixel values. They can also be understood to be characteristic parameters.

The invention is in fact applicable in principle in the same way to characteristic parameters obtainable pixel by pixel as well as to characteristic parameters which require (statistical) evaluation of the entire image. In particular, the average values mentioned hereafter (as characteristic parameters) can be determined either on a pixel basis (i.e. a respective average value for the same pixel can be determined from a plurality of images) or on the basis of a pixel-independent variable (entropy, contrast, image definition for every image, averaged over all images).

It can be provided in a further development of this embodiment that the characteristic parameter comprises at least one of contrast, image definition, image content, information content of the image. The operationality of the inspection device can be determined particularly advantageously by using these characteristic parameters.

Furthermore, if the difference in terms of the value is greater than a predefined threshold value, then the inspection device can be determined to be non-operational and/or if the difference in terms of the value is smaller than the predefined threshold value, then the inspection device can be determined to be operational. If, for example, the lens of an inspection device configured as a camera fogs up, then the contrast deteriorates considerably over a certain period of time. This becomes evident in the change in the corresponding parameter in the recorded images and therefore also in the reference image. By taking the respective threshold value into account, it can then be determined whether a deterioration in the ability of the inspection device to inspect is present.

In one embodiment, the reference image is determined as the average value of the number of images previously recorded. Since averaged values are less susceptible to spontaneous changes in the images (which are typically characteristic of fouling), this averaging to obtain the reference image can ensure that information that is substantially container-independent and thereby characteristic of the inspection device is used.

In a further development of this embodiment, the number of previously recorded images is n and the reference image or at least one value a characterizing the reference image is determined from $$\sum_{i=1}^{n} \frac{a_i}{n}$$

and where a new reference image is determined when a new image is recorded, where the characteristic value of the new image is $a_{n+1}$ and where a new value characterizing the reference image is determined from $$\sum_{i=2}^{n+1} \frac{a_i}{n}$$

or where the new value characterizing the reference image is determined from $$\left(\frac{n-1}{n} \sum_{i=1}^{n} \frac{a_i}{n}\right) + \frac{1}{n} a_{n+1}.$$

As already mentioned, the characteristic value $a_i$ can either be a value that can be determined for each pixel (e.g. its color values) or the characteristic value $a_i$ (also charac-teristic parameter) can be a value that can only be determined from a (statistical) evaluation of the entire image information and is therefore (largely) independently of the values of individual pixels or is a value from which conclusions can no longer be drawn about the values of specific pixels in the image. These would be contrast, image definition, brightness and so on.

With this embodiment, the calculation of the characteristic value also becomes insensitive to isolated events such as the actual fouling of a container.

Furthermore, it can be provided that the inspection device records an image of each container moved past the inspection device and the recorded image is compared with the reference image. Since every container has to be inspected anyway, the images recorded in the process can also be used advantageously for (permanent) verification of the operationality of the inspection device.

It is further preferred that the containers are no test containers. Since such use of test containers is no longer required, the throughput of the inspection apparatus is increased.

In a further embodiment, the method further comprises recording an image of a test container moved past the inspection device and comparing the recorded image of the test container with the reference image to obtain a first comparison result and comparing a test image associated with the test container with the reference image to obtain a second comparison result. The occasional use of such test containers can ensure that even the slightest deterioration in the quality of the inspection device can be detected, thereby ensuring the high quality of the inspection at all times.

In a further development of this embodiment, the method also comprises comparing the first comparison result with the second comparison result, where it is determined on the basis of this comparison whether the inspection device is operational. Since the test image or the image associated with the test container shows a definitively clean and undamaged container, the two comparisons provided can ensure that any impaired operationality of the inspection device is reliably detected.

The inspection apparatus according to the invention for containers, such as bottles, comprises an inspection device and an evaluation device connected to the inspection device, where the inspection device is configured to record an image of a container moved past the inspection device and to transmit the recorded image and/or at least part of the information of the image to the evaluation device, where the evaluation device is configured to compare the recorded image with a reference image, where the reference image is formed from a number of previously recorded images of containers moved past the inspection device, and where the evaluation device is configured to determine in dependence of the comparison of the recorded image with the reference image whether the inspection device is operational and where the inspection apparatus for performing an inspection method is formed according to one of the preceding embodiments.

The advantages of the inspection method according to the invention are realized with this apparatus.

It can be provided that the inspection device comprises a camera and a light source, where a container is moved past between the camera and the light source by way of a transport device and the camera is arranged such that it can record an image of the container which is illuminated by the light source.

The recording of translucently irradiated containers and corresponding images can be advantageous for detecting as much fouling or damage as possible.

DETAILED DESCRIPTION

Figure 1:
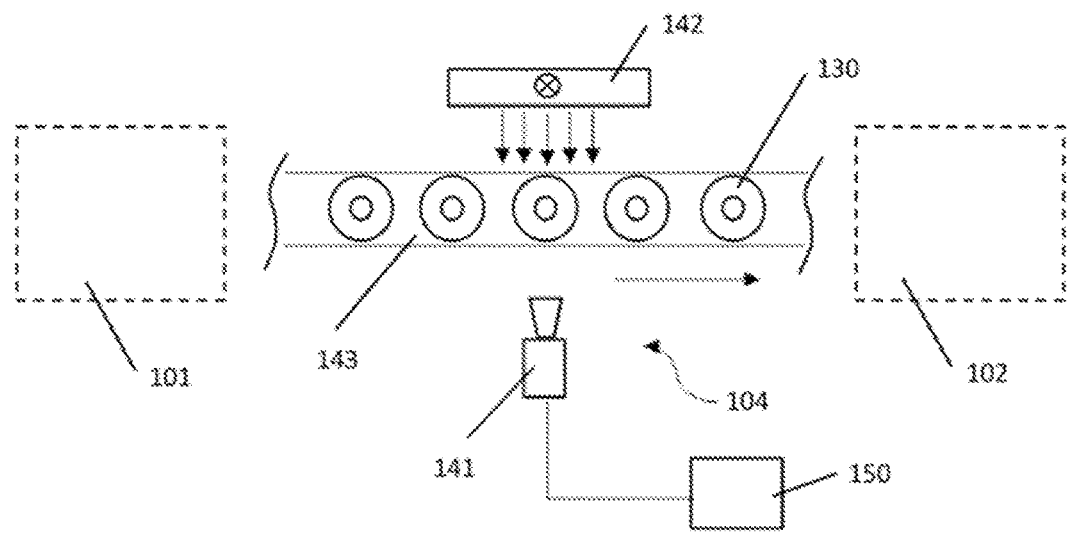
FIG. 1 shows an embodiment of an inspection apparatus for carrying out the inspection method according to the invention.

FIG. 1 shows an inspection apparatus 104 in a container treatment system (not shown in more detail). In the embodiment presently shown, inspection apparatus 104 is arranged between two container treatment machines 101 and 102 that are arranged one after the other in the direction of transport of the containers. In principle, the container treatment machines can be any conceivable container treatment machine. First container treatment machine 101 upstream of inspection apparatus 104 can be, for example, a container cleaning machine. Container cleaning machines are commonly used to remove fouling from recyclable containers, such as glass bottles. After passing through the container cleaning machine, an inspection apparatus 104 can advantageously be arranged for verifying prior to a further treatment step (e.g. in a further container treatment machine 102 configured as a filler) whether the containers have then been completely cleaned as expected and/or have no damage, such as fractured glass.

Alternatively, container treatment machine 101 can also be a machine that is somehow related to the manufacture of a container. In particular, this can be a blow molding machine, a stretch blow molding machine in general, a mold filling machine or the like.

Inspection apparatus 104 is preferably arranged between a container treatment machine 101 associated with the manufacture and/or cleaning of the containers and the further container treatment machine 102. The latter, i.e. container treatment machine 102, can preferably be a filler or a capper or a labeler. Further container treatment machine 102 particularly preferably comprises in the direction of transport of the containers a filler, a capper (both can also be integrated into one container treatment machine), a labeler, and/or a direct printing machine for applying one or more decorative elements onto the containers.

A packer can then also be formed further downstream, for example, as part of the container treatment machine.

In principle, the invention is not restricted with regard to the arrangement of the inspection apparatus according to the invention in a container treatment system comprising upstream or downstream container treatment machines and the above explanations are to be understood to be only by way of example. In fact, the inspection apparatus according to the invention can be arranged in any container treatment system where inspection apparatuses are commonly used.

In any case, inspection apparatus 104 comprises an inspection device 141 which is presently illustrated as a camera. Optionally, it can also be provided that inspection apparatus 104 comprises a light source, such as diffuser light source 143, which is arranged with regard to the containers on the side opposite to camera 141. In this way, the diffuser light source shines through containers 130 arranged in transport device 143 and the camera subsequently records as an image the containers through which the light respectively passed through. A diffuser light source provides the advantage that the illumination of the containers is always uniform so that any unwanted imaging of the light source can be prevented.

In the embodiment presently shown, the transport device is configured, for example, as a transport belt or as the centering device receiving the containers (for example, comprising a stand plate and a centering bell). The images of the containers recorded are therefore always side views in the embodiment shown in FIG. 1. In principle, however, inspection apparatuses are known from prior art with which an inspection of the mouth region and/or an inspection of the base of the containers is also possible. The inspection apparatus according to the invention can also be configured accordingly, so that inspection of the mouth region or the base is also possible. This can typically be implemented by using suitable mirrors, for example, which redirect the diffuser light source such that the mouth region or base region is illuminated and/or the base region or the mouth region is imaged in the inspection device or camera 141.

As an alternative to transport device 143 described, the transportation of the containers can also be carried out in a suspended or just standing manner Suspended transportation is particularly advantageous when the base region is to be inspected. Standing transportation only, without the use of a centering device is advantageous for inspecting the mouth region.

According to the invention, the inspection apparatus typically comprises a control unit, such as a computer. This control unit is understood in particular to be an evaluation device with which the images of containers recorded by inspection device 141 can be evaluated.

While the inspection device has presently been described as comprising a camera 141 and a light source, in particular a diffuser light source 142, has also been described, other embodiments are also conceivable. In particular, all the options for inspecting containers known in prior art can be implemented within the scope of the inspection apparatus according to the invention, since the inspection apparatus according to the invention requires that "images", i.e. some kind of visual information of the containers to be inspected, be recorded.

While the inspections of glass bottles are typically carried out using the inspection apparatuses and the inspection method according to the invention, the invention is not restricted in this regard. Other types of containers can also be inspected, and the invention is in particular not restricted to the shape of containers as "bottles".

Figure 2:
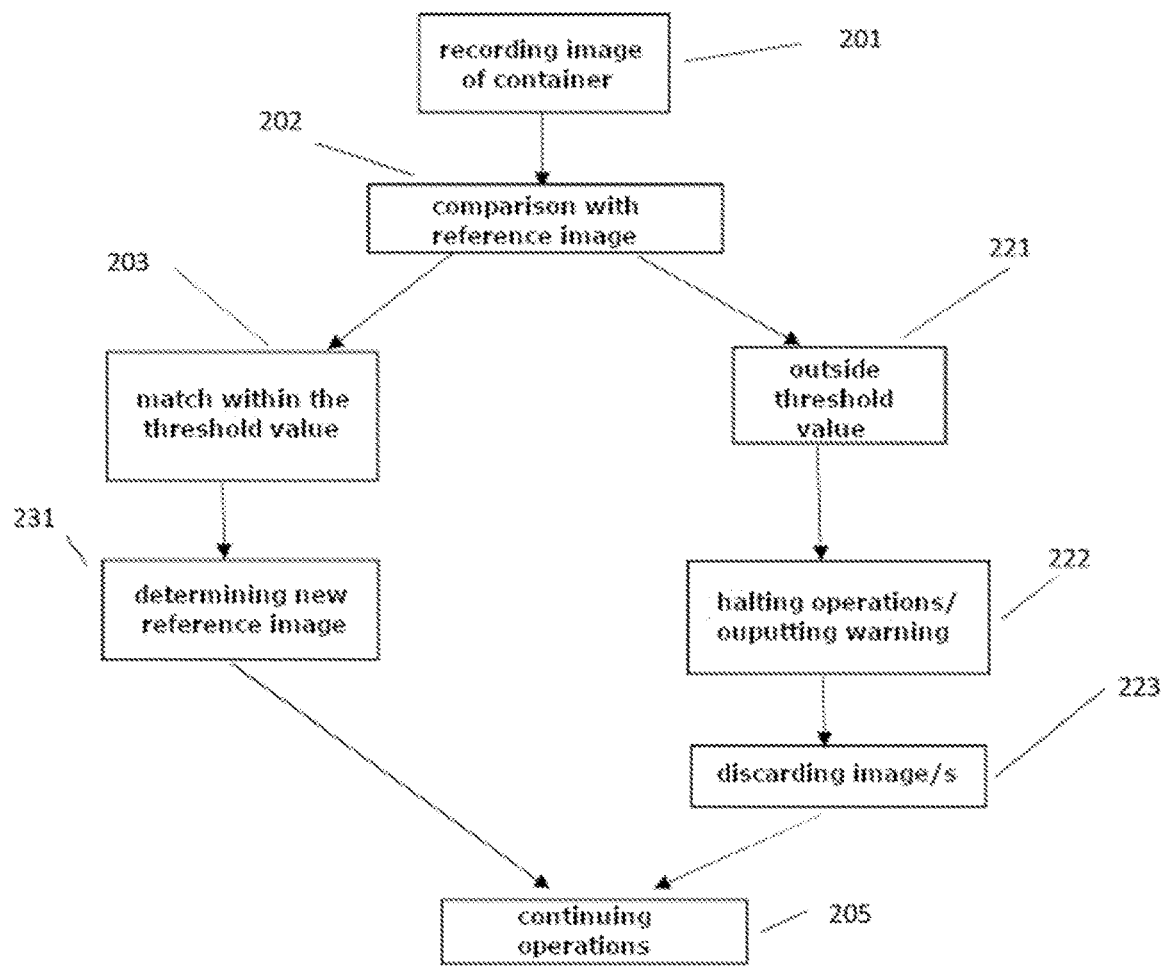
FIG. 2 shows a flow chart for carrying out an inspection method according to an embodiment.

FIG. 2 shows an embodiment of the method according to the invention.

FIG. 2 shows the method according to the invention in the form of a flow chart.

The method begins with a first step 201, in which an image of a container currently being moved past inspection device 141 from FIG. 1 in transport device 143 is recorded with the aid of the inspection device. This can be, for example, an image that was recorded in the range of the electromagnetic spectrum visible to humans Other parts of the spectrum can also be used for recording an image. For example, the recording can also comprise a part of the infrared and/or the ultraviolet and presently in particular the X-ray spectrum. The invention is not restricted in this regard.

The image recorded in this manner is then compared (by way of evaluation device 150) with a reference image stored in a memory of the evaluation device. According to the invention, this reference image is generated from a number of previously recorded images of containers moved past the inspection device. "Previously" in this context means that the images were recorded prior to the current image. The number of previously recorded images on which the reference image is based can be fixed. For example, the last 300 images can always be used to calculate the reference image. It is not necessary for the previously recorded images to be immediately consecutive images of immediately consecutive containers. For example, only the image of every second container can also be used for determining the reference image from a series of such images of every second container.

In particular, the reference image can have been or be determined from the average value of the preceding images. The average value $a^{(n)}$ with regard to a certain property $a_i$ of the individual image points or pixels results for the respective pixel from the following formula:

$$a^{(n)} = \sum_{k=1}^{n} \frac{a_i}{n},$$

where can be the value of a specific pixel in the $i^{th}$ image and n the number of images. The average value therefore indicates the average value of the property (e.g. blue color value) of the pixel over all images n that were recorded or taken into account. The average value $a^{(n)}$ therefore indicates the average value of the property (e.g. blue color value) of the pixel over all images n that were recorded or taken into account. An entire "reference image" can therefore be determined from the previous images by repeating this process for each pixel.

The procedure presently described would be used, for example, for a pixel-by-pixel determination of the values a that are relevant for each pixel. This can be used to differentiate between spots on a lens and container fouling. The spot of the lens will find a correspondence in the values $a^{(n)}$ for the pixels imaging that spot, because a spot on the lens is present over a long period of time and therefore over a plurality of images (possibly even all). Spots on individual containers, on the other hand, only appear on one image, such as image number k, but not on the other images at the same location and therefore at the same pixels, so that such container-specific fouling is strongly suppressed by averaging to determine the reference image.

Alternatively or additionally, however, other properties (also referred to as characteristic parameters) that do not result in a pixel-based assignment of values can also be used. This applies to contrast, image definition, entropy and the like. Although these quasi "macroscopic" variables are calculated from all pixel values, a specific value of the contrast, however, no longer allows for any conclusions to be drawn about the pixel values of individual, specific pixels. These variables are therefore only statistical variables that can be associated with entire images.

However, formally the same formula above is used to determine the characteristic parameter.

In this embodiment, determining the above average value (if $a_i$ is, for example, the contrast of image i) causes a "statistic of a statistic" so that the statistically determined values (such as contrast) of each image can be statistically evaluated together with the other images. For example, determining the average value of the contrast over a plurality of n images can be used to determine an average contrast which considers the random, non-systemic changes in contrast (i.e. not representing fouling of the lens) from image to image in a manner less pronounced than systemic trends such as lens fogging. This average value can then be used to examine the contrast of a currently recorded image. If the contrast deviates significantly from the preceding average, then this can be an indication of the lens fogging up.

It is understood that the calculation of the "reference image" (which should also be understood to comprise the characteristic parameters) does not require a complete calculation of an image. For the calculation of a "reference image" for verifying the operationality of the inspection device, it is sufficient, for example, if the characteristic parameter or value or the property, as described above, is determined from a plurality of recorded images and is compared with a currently recorded image. For example, only contrast values can be created as "reference images". The images from which these contrast values were determined can, but do not need to, be stored.

Regardless of which properties are presently used, the invention provides that the comparison of the recorded image with the reference image then either delivers information that the reference image corresponds to the recorded image approximately within a certain limit value or threshold value (e.g. standard deviation). It can there be provided that a deviation of the current image from the reference image (or the above average value) by 0.5% is to be regarded as still matching the reference image. This value is not mandatory. Absolute deviations can also be specified as threshold values, or other relative deviations.

If it is now determined in step 203 (regardless of the selection of the limit value or threshold value) that the image of the container recorded matches the reference image, then the image of the container currently recorded can then be used to calculate a new reference value or a new reference image in step 231. This step is not mandatory, but is advantageously carried out in order to take account of any changes in the recording of the images that are caused by the aging of the inspection device and are not related to a deterioration of the inspection device that has occurred, Operations can then continue using this new reference image 205.

As has already described been above, it can also be provided alternatively that the reference image is not updated by every image of every container recorded, but rather only every image of every second container is used for updating the reference image. In such a case, step 231 would then not occur for every container.

Operations are subsequently continued 205 with the possibly new reference image, so that the method finally returns to step 201 and the image of a further container is recorded in order to inspect it.

While the method described in the preceding steps is aimed at detecting any malfunctions of the inspection device, it is of course provided in parallel that the image recorded by the inspection device is analyzed to determine whether the container has fouling and/or damage. This takes place in a known manner independently of the method described in FIG. 2.

In particular, step 202 of comparing the recorded image with the reference image comprises a comparison with regard to a parameter that is characteristic of the operationality of the inspection device, which parameter is determined, firstly, from the reference image and, secondly, from the recorded image in order to determine, based on a comparison of parameters thus determined, whether the inspection device works reliably. This parameter can be, for example, the overall contrast that is obtained in the recorded image or the reference image, the image definition of these two images, or the image content as well as the overall information content of the image (presently also analogously the entropy of the image). These values are typically independent of the current container image with regard to existing fouling or fractured glass, since the contrast is substantially determined, firstly, by the light source and, secondly, by the inspection device. Changes in the contrast of the recorded image compared to the reference image can therefore mean, for example, that the lens of a camera used as an inspection device fogs up. Certain constants in the image content can instead indicate that the lens itself is dirty instead of the containers being fouled.

With regard to the reference image with which the recorded image is compared, it can be provided, for example, that this reference image is determined from the average value of the previously recorded images. This can be done in particular with regard to a value or parameter $a^{(n)}$ characterizing the reference image, as already mentioned above. If this value is, for example, the contrast, then it can be determined by averaging the contrasts $a_i$ obtained in the previous images. This can be done, for example, as $$a^{(n)} = \sum_{i=1}^{n} \frac{a_i}{n}$$

The newly recorded image can then be used for determining a new reference value according to the formula $$a^{(n+1)} = \left(\frac{n-1}{n}\sum_{i=1}^{n}\frac{a_i}{n}\right) + \frac{1}{n}a_{n+1}$$

to determine the reference image or the characteristic value for the reference image (e.g. a contrast).

Advantageously, the current image is used to determine the updated reference image only if it is determined that the current image matches the reference image within the threshold value (see step 203).

Returning to the method described in FIG. 2, it can also be determined (step 221) that the recorded image does not match the reference image within the threshold value. In this case, the evaluation device can, for example, output a signal that a malfunction of the inspection device is likely and/or given. This signal can be, for example, displayed on a screen for the operator who can then verify whether such an impairment of the inspection device is in fact given. As an alternative or in addition thereto, it can also be provided that the evaluation device halts operations of at least the inspection device in an automated manner Both cases are described by step 222.

At least the image of the currently recorded container is advantageously discarded in step 223. The discarding of the currently recorded image in step 223 takes place for the reason that it is known at this point in time that a malfunction of the inspection device is probably or definitely given and the current image of the container was recorded with this malfunction. Using this correspondingly systematically faulty image to determine an updated reference image would lead to incorrect results in the subsequent analysis of the images subsequently recorded with regard to the operationality of the inspection device.

In addition, it can be provided that a defined number of previously recorded images is likewise discarded and the reference image is recalculated based on the images recorded before that time. This can be advantageous in the event that the malfunction of the inspection device developed over a certain period of time (e.g. the lens of the container fogged up), but this malfunction was only so pronounced from a certain container that it led to a lack of conformity of the image of that container recorded compared with the reference image. In this way, falsifications of the reference image can be kept to a minimum.

However, step 223 is only optional. The image can also be stored (permanently) in a memory associated with the evaluation device, for example, for further fault analysis of the malfunction of the inspection device or of the entire inspection apparatus.

Subsequently, for example when the malfunction of the inspection device has been rectified, operations can be continued in step 205 analogously to the first case in which a match between the currently recorded image and the reference value was determined.

The embodiments described so far have always made use of the fact that only images of real containers (which are actually to be inspected by the inspection device for unknown defects or fouling) are recorded and processed using the inspection device, for example, to determine whether the container is fouled or damaged and/or to determine at the same time whether the inspection device has a fault.

The embodiments of the method and inspection apparatus according to the invention advantageously make it possible to dispense with the use of test containers during regular operations or at least to extend the intervals in which no test containers are introduced into the inspection device for verifying in the usual manner whether the inspection device has a fault.

Figure 3:
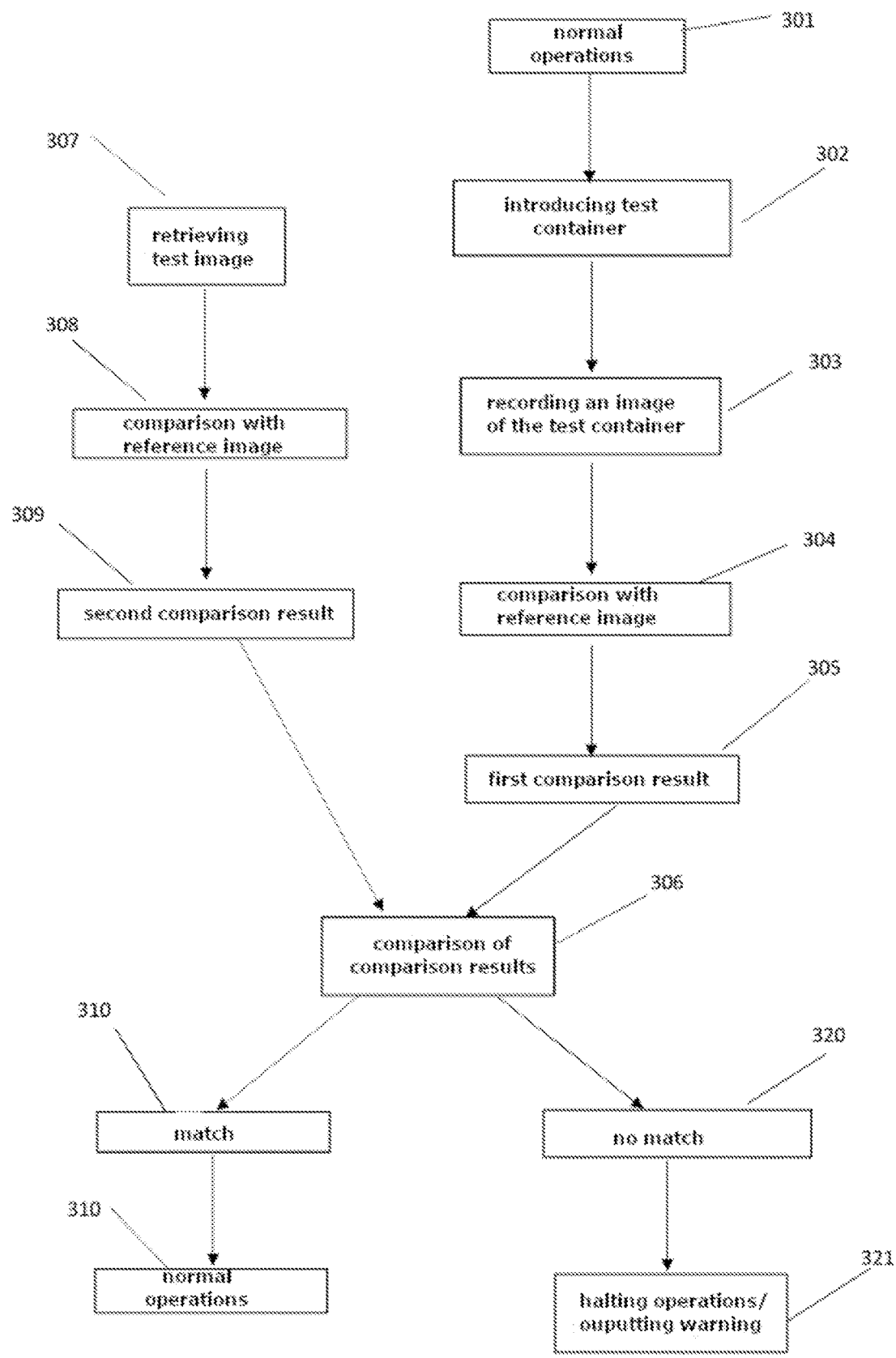
FIG. 3 shows a flow chart of a further embodiment using test containers.

FIG. 3 now describes a further embodiment of the method in which test containers are nevertheless used in addition to the embodiments previously described. This can be particularly advantageous for detecting deteriorations or faults in the inspection device that occur only very slowly.

FIG. 3 shows the method according to this embodiment again in a flowchart.

The method can be used at any time during regular operations of the inspection device. For example, it can start after inspecting 10,000 containers during normal operations 301. At this point in time, a test container instead of a normal container is then introduced into the container flow by the inspection apparatus in step 302. An image of the test container is then recorded from this container in step 303 analogously to the methods described above. This image is recorded by the inspection device, as would be the case with a conventional container, in order to avoid any systematic faults there.

After the image has been recorded 303 by the inspection device, this recorded image is then compared in step 304 with the reference image, where the reference image is the reference image already discussed with reference to FIG. 2. This comparison can either relate to the entire recorded image and the entire reference image or, as already explained in FIG. 2, only to one parameter that characterizes the operationality of the inspection device, such as the brightness, the contrast, the image content, or the entropy of the image, which is then first determined from the recorded image in order to compare it with the corresponding value of the reference image.

A first comparison result is obtained from this comparison, for example, by calculating the difference. This means that, for example, the contrast value of the reference image is subtracted from the contrast value of the image of the test container recorded. This difference then delivers a first comparison result 305.

Steps 307 to 309 to be described now take place parallel to this or temporally after determining the first comparison result or prior to determining the first comparison result. In step 307, a test image associated with the test container is retrieved, for example, from a memory associated with the evaluation device or from another source. This test image was preferably created under ideal conditions of the inspection device and represents the test container. If, for example, fouling is simulated at a certain spot on the test container, then this can also be seen on the test image associated with this test container.

In the next step 308, this test image is then compared with the reference image (in analogy to step 304). Correspondingly, a second comparison result is there created in step 309. The first comparison result and the second comparison result are preferably of the same type, i.e. they relate, for example, to either the entire image information or to the image content or to the contrast or respective other parameters that preferably characterize the operationality of the inspection device.

Irrespective of the chronological order in which the first comparison result and the second comparison result are obtained, a comparison 306 of the first comparison result and the second comparison result is carried out in the next step, for example, by calculating the difference between the respective parameters. If it is determined that the first comparison result and the second comparison result match (approximately up to a certain fault tolerance), then the match can be determined in step 310 and it can be concluded at the same time or based thereupon that the inspection device is operating properly.

Normal operations can then be continued in step 311 and a container actually to be examined with the inspection device can be guided past the inspection device as the next container which is then inspected using the method according to FIG. 2 and it is determined at the same time whether the inspection device is still operating properly.

If, on the other hand, it is determined in step 306 that the comparison results do not match (not even within an acceptable fault tolerance or a threshold value), then, in the case of no match 320, operations can be halted in step 321 and/or a warning can be output which is shown to an operator on a suitable display and causes him to examine the inspection device or the entire inspection apparatus, for example, to determine whether it is in fact not operating properly or whether it is operating properly.

Operations can thereafter be continued.

The procedure described in FIG. 3 ensures, firstly, that the images of the test containers recorded with the current setting match the expected image values (for example, contrast or the like) within the framework of the reference image. On the other hand, the comparison of the reference image with the test image ensures that the image recorded by the inspection device in fact matches the expected image of the test container (e.g. all fouling provided on the test container is in the correct spot).

In this way, systematic faults can be prevented to the extent possible and operations of the inspection device can be continued reliably.

While so far only the examination of the operationality of the inspection device itself has been discussed in isolation, the embodiments of the inspection method presently described can also be used in combination with other methods to examine or ensure the overall operationality of a container treatment system and/or to output suitable information to the operator.

It is known, for example, to carry out a residual liquid check and/or caustic solution check within the framework of container cleaning machines, which is carried out, for example, with the aid of infrared light or high-frequency ultrasound. Respective methods are known from prior art.

While these methods cannot be performed using the inspection method of the present invention, they can be used advantageously in combination therewith. In order to cyclically examine the operationality of a bottle cleaning machine, for example, at hourly intervals or at intervals of a certain container throughput, test bottles or generally test bodies or test objects, which preferably have the shape of the container to be cleaned, can be passed through the container treatment machine and, if necessary, also through the inspection device. At the same time, it can also be determined whether any discharge devices for containers are operating correctly. The information then obtained can be logged, preferably together with respective results from the method according to the invention for examining the operationality of the inspection device.

A test log can then be created which, in addition to the typical cyclical evaluations of the operationality of the bottle cleaning machine, also contains an (at least cyclical) determination of whether the inspection device is operational.

It can provide the operator with a log of the operationality of the entire container treatment system or of at least the bottle cleaning machine and the downstream inspection device in a simple manner, for example, in the form of a single file, such as a PDF file or spreadsheet, that is output to a screen (such as a screen of an operator terminal of a container treatment system and/or of the container cleaning machine and/or of the inspection device).

The operator can then determine more easily and preferably at a glance (i.e. without opening additional files) whether the system is operating properly.

While it has already been described that information about the operationality of the inspection device is output, it is to be expressly pointed out again that warnings and/or a halt function of the inspection device and/or the container treatment system or one or more container treatment machines, such as the bottle cleaning machine, can also be output in addition or as an alternative to information that is indicative of the operationality of the inspection device itself.

It can there be provided in particular that these warnings or signals are output in dependence of certain threshold values or parameters being exceeded.

For example, if a characteristic parameter and/or the recorded image deviates from the reference image (or a reference value calculated from previous images) by 0.5%, a warning can be output that the optics of the inspection device are to be cleaned soon, for example, within the next 20 minutes. If this deviation continues to increase and subsequently reaches, for example, 1% of the reference value, for example, of the previously calculated average value for the contrast based on the reference image, then the container treatment system and in particular the inspection device can be halted in an automated manner, i.e. its operation can be interrupted and the operator can be requested to perform cleaning immediately.

Other implementations of these specific embodiments, basically based on a degree of deviation of a currently measured value from an expected value and/or limit value and/or an (entire) reference image such that a threshold or a threshold value is exceeded, can presently also be considered.

The invention claimed is:

1. An inspection method for inspecting containers, where an image of a container moved past an inspection device is recorded by said inspection device and said recorded image is compared with a reference image, where said reference image is formed from a number of previously recorded images of containers moved past said inspection device and in dependence of the comparison of said recorded image with said reference image a determination as to whether said inspection device is operational is made, where said containers are not test containers.

2. The inspection method according to claim 1, where the method comprises determining from said reference image and from said recorded image a parameter that is characteristic of the operationality of said inspection device, and where in dependence of a difference between the parameter determined from said reference image and the parameter determined from said recorded image a determination as to whether said inspection device is operational is made.

3. The inspection method according to claim 2, where the characteristic parameter comprises at least one of contrast, image definition, image content, and information content of said image.

4. The inspection method according to claim 2, where, if the difference in terms of the value is greater than a predefined threshold value, then said inspection device is determined to be non-operational and/or where, if the difference in terms of the value is smaller than the predefined threshold value, then said inspection device is determined to be operational.

5. The inspection method according to claim 1, where said reference image is determined as an average value of the number of previously recorded images.

6. The inspection method according to claim 5, where the number of previously recorded images is n and said reference image or at least a value characterizing said reference image is determined from $$\sum_{i=1}^{n} \frac{a_i}{n},$$

where a new reference image is determined when a new image is recorded, where the characteristic value of said new image is $a_{n+1}$, and where a new value characterizing said reference image is determined from $$\sum_{k=2}^{n+1} \frac{a_i}{n}$$

or the new value characterizing said reference image is determined from $$\left(\frac{n-1}{n}\sum_{i=1}^{n}\frac{a_i}{n}\right) + \frac{1}{n}a_{n+1}.$$

7. The inspection method according to claim 1, where said inspection device records images of a plurality of containers moved past said inspection device, and where each image is a recorded image that is compared with said reference image.

8. The inspection method according to claim 1, where test containers are containers that have a fouling applied to them.

9. The inspection method according to claim 1, where the method further comprises recording an image of a test container moved past said inspection device and comparing said recorded image of said test container with said reference image to obtain a first comparison result and comparing a test image associated with said test container with said reference image to obtain a second comparison result.

10. The inspection method according to claim 9, where the method further comprises comparing the first comparison result with the second comparison result, and where on the basis of this comparison a determination as to whether said inspection device is operational is made.

11. An inspection apparatus for containers, comprising an inspection device and an evaluation device connected to said inspection device, where said inspection device is configured to record the image of a container moved past said inspection device and to transmit said recorded image and/or at least part of information of said image to said evaluation device, where said evaluation device is configured to compare said recorded image with the reference image, where said reference image is formed from the number of previously recorded images of containers moved past said inspection device, where the evaluation device is configured to determine in dependence of the comparison of said recorded image with said reference image whether said inspection device is operational, and where said inspection apparatus for performing the inspection method is formed according to claim 3.

12. The inspection apparatus according to claim 11, where said inspection device comprises a camera and a light source, where the container is moved past between said camera and said light source by way of a transport device and said camera is arranged such that said inspection device can record an image of said container which is illuminated by said light source.

* * * * *